United States Patent [19]
Bunshah et al.

[11] Patent Number: 5,316,636
[45] Date of Patent: May 31, 1994

[54] PRODUCTION OF FULLERENES BY ELECTRON BEAM EVAPORATION

[75] Inventors: Rointan F. Bunshah, Playa del Rey; Shyankay Jou, Santa Monica; Shiva Prakash, Santa Barbara; Hans J. Doerr, Westlake Village, all of Calif.

[73] Assignee: The Regents of the University of California, Oakland, Calif.

[21] Appl. No.: 928,994

[22] Filed: Aug. 12, 1992

[51] Int. Cl.$^5$ .............................................. C06B 31/00
[52] U.S. Cl. .......................... 204/157.47; 423/445 B
[58] Field of Search ............ 423/445 B; 204/157.47; 427/460, 562, 566

[56] References Cited

FOREIGN PATENT DOCUMENTS

WO9204279 3/1992 PCT Int'l Appl. .

OTHER PUBLICATIONS

Kratschmer et al. "Spectroscopy or Matrix-Isolated Carbon Cluster Molecules Between 200 and 850 nm Wavelength", *Surface Science*, vol. 156 (1985) pp. 814–821.

Haufler et al. "Carbon Arc Generation of $C_{60}$", *Mat. Res. Soc. Symp. Proc.* vol. 206, Nov. 29, 1990, pp. 627–637.

Strem Chemicals, Inc. "Procedure for Extracting Fullerenes from Raw Soot", Jul. 22, 1991.

*Primary Examiner*—Michael Lewis
*Assistant Examiner*—Stephen G. Kalinchak
*Attorney, Agent, or Firm*—Poms, Smith, Lande & Rose

[57] ABSTRACT

A process and system for producing fullerenes by electron beam evaporation of a carbon target in a vacuum. A carbon target is evaporated by an electron beam in a vacuum to form a flux of carbon atoms or clusters. The evaporated carbon atoms or clusters are deposited onto collection substrates which are electrically charged and heated or neutral and chilled. The resulting carbon soot is extracted to recover fullerenes. The process produces carbon soot which is rich in $C_{70}$ and higher fullerenes.

8 Claims, 2 Drawing Sheets

PRODUCTION OF FULLERENES BY ELECTRON BEAM EVAPORATION

BACKGROUND OF THE INVENTION

1. Field of the Invention

The present invention relates generally to processes and systems for producing fullerenes. More particularly, the present invention relates to the production of fullerenes utilizing electron beam evaporation.

2. Description of Related Art

The publications and other reference materials referred to herein to describe the background of the invention and to provide additional details regarding its practice are hereby incorporated by reference. For convenience, the reference materials are numerically referenced and identified in the appended bibliography.

Fullerenes are cage-like molecules which constitute the third form of pure carbon. The other two pure forms of carbon are diamond and graphite. $C_{60}$ was one of the first fullerenes to be produced in gram quantities. The initial processes for producing $C_{60}$ involve the use of resistive (1, 2) or arc heating (3) of graphite. The availability of gram quantities of $C_{60}$ has lead to a period of intense ongoing research into the chemical, physical and material properties of this first molecular allotrope of carbon (4, 5).

More recently, many additional fullerenes have been isolated. $C_{70}$, $C_{76}$, $C_{78}$, $C_{84}$, $C_{90}$, $C_{94}$ and $C_{96}$ are just a few of the additional fullerenes which have been identified (6). These fullerenes have been commonly referred to as the "higher" fullerenes.

International Patent Application No. WO92/04279 published on Mar. 19, 1992, discloses an exemplary method for producing fullerenes. This method, like the above-described methods involves the resistive or arc heating of graphite in the presence of an inert quenching gas to form a black soot material which contains fullerenes. As set forth in this published patent application, $C_{60}$ is the predominant fullerene produced in the process where carbon is evaporated in the presence of an inert quenching gas. When the pressure of the inert gas is on the order of 100 Torr, the fullerene product isolated from the soot contains 60 to 70 weight % $C_{60}$, 20 to 30% $C_{70}$ and approximately 5 weight % of higher fullerenes in the range between $C_{76}$ and $C_{96}$ (5 - pp. 119-126).

Although the above procedures are capable of producing relatively large amounts of $C_{60}$ and $C_{70}$, the isolation of higher fullerenes, e.g. $C_{76}$, $C_{78}$ and $C_{78}$ from these mixtures is tedious and yields only limited amounts of pure materials. Since investigations now show that the chemistry of higher fullerenes promises to be diverse and distinctly different from the chemistry of $C_{60}$ and $C_{70}$, it would be desirable to provide processes and systems for preparing the higher fullerenes in larger quantities (7).

Laser vaporization of a rotating graphite target in a tube furnace (5 - pp. 98-105) and inductive heating of graphite powder (8) have also been used in fullerene production processes. Both of these vaporization methods also yield soot in which $C_{60}$ is by far the predominant product. Also, $C_{60}$ and $C_{70}$ have been isolated from the soot produced in oxidizing benzene flames. Depending upon the conditions, variations of the $C_{70}/C_{60}$ ratio range from about 0.26 to 5.27 (9).

In view of the continuing significant interest in fullerenes, there is a continuing need to provide processes and systems for producing a variety of fullerenes in useful amounts which can be used for further study and evaluation. Further, there is a need to provide processes and systems which are capable of producing fullerene mixtures which are especially rich the higher fullerenes, i.e. $C_{76}$–$C_{96}$.

SUMMARY OF THE INVENTION

In accordance with the present invention, a process and system are provided for preferentially producing $C_{70}$ and the higher fullerenes with only minor amounts of $C_{60}$ being produced. The present invention is based upon the discovery that electron beam evaporation of a carbon target in a vacuum produces soot which is especially rich in $C_{70}$ and other high fullerenes. In the process of the present invention, fullerenes are produced by bombarding a carbon target with an electron beam which has sufficient energy to evaporate carbon atoms or clusters from the target. The evaporated carbon atoms or clusters form a carbon soot which is deposited on substrate surfaces located in the evaporation zone and on the reactor walls. Extraction of the soot with non-polar solvents results in the recovery of a mixture of fullerenes which is consistently rich in $C_{70}$ and the higher fullerenes with only minor amounts of $C_{60}$ being present.

As a feature of the present invention, the well known principles electron beam evaporation are applied to atomizing graphite or other suitable carbon targets to form a vapor of evaporated carbon atoms or clusters in a vacuum. The evaporated carbon atoms or clusters form a soot that, when deposited on suitable substrates, contains appreciable amounts of fullerenes. Electron beam evaporation of the carbon target in a vacuum is a significant departure from the conventional resistive or arc heating used in prior processes to vaporize graphite targets. In accordance with the present invention, it was discovered that electron beam evaporation of a carbon target not only produced significant amounts of fullerenes, but that the soot is especially rich in $C_{70}$ and the higher fullerenes.

As a feature of the present invention, soot collected from different portions of the reactor walls and from different substrates located at different positions with respect to the carbon target contain differing amounts of $C_{70}$ and the higher fullerenes. In all cases, however, only a minor amount of $C_{60}$ is present. This feature provides the ability to selectively emphasize the production of certain higher fullerenes by isolating and extracting soot from different locations in the electron beam evaporation vessel.

As a further feature of the present invention, an anode substrate and a cathode substrate are provided wherein an electric potential is applied between the two substrates. Many of the carbon atoms or clusters generated from the electron beam bombardment of the target are ionized preferentially deposit on the cathode substrate to provide a soot that is rich in $C_{70}$ and the other higher fullerenes. A much smaller amount of soot is also deposited on the anode. In addition, a chilled, non-charged substrate is utilized to provide a third substrate location on which evaporated carbon atoms or clusters may deposit to form soot which is also rich in $C_{70}$ and other higher fullerenes.

The process and system in accordance with the present invention provides an important alternative to prior procedures which are based upon evaporation of carbon by electrical resistance or thermal heating. In addition, the present invention provides for the recovery of relatively large amounts of $C_{70}$ and the higher fullerenes.

The above-described and many other features and attendant advantages of the present invention will become better understood by reference to the following description of the preferred embodiments, when taken in conjunction with the accompanying drawings.

DESCRIPTION OF THE PREFERRED EMBODIMENTS

The present invention involves the production of fullerenes by subjecting a carbon target to electron beam evaporation in a vacuum. Carbon soot produced from the evaporated carbon is recovered from substrate and reactor surfaces and treated in accordance with known extraction procedures to recover fullerenes.

Electron beam evaporation of a wide variety of materials is well known and has been widely practiced in connection with the deposition of thin films (10, 11). In accordance with the present invention, it was discovered that conventional electron beam evaporation techniques, when applied to a suitable carbon target, can be effective in producing carbon soot which contains fullerenes. Further, it was discovered that the fullerenes present in the carbon soot produced by electron beam evaporation are especially rich in the higher fullerenes, i.e. $C_{70}$, $C_{76}$, $C_{78}$ and $C_{84}$.

Figure 1:
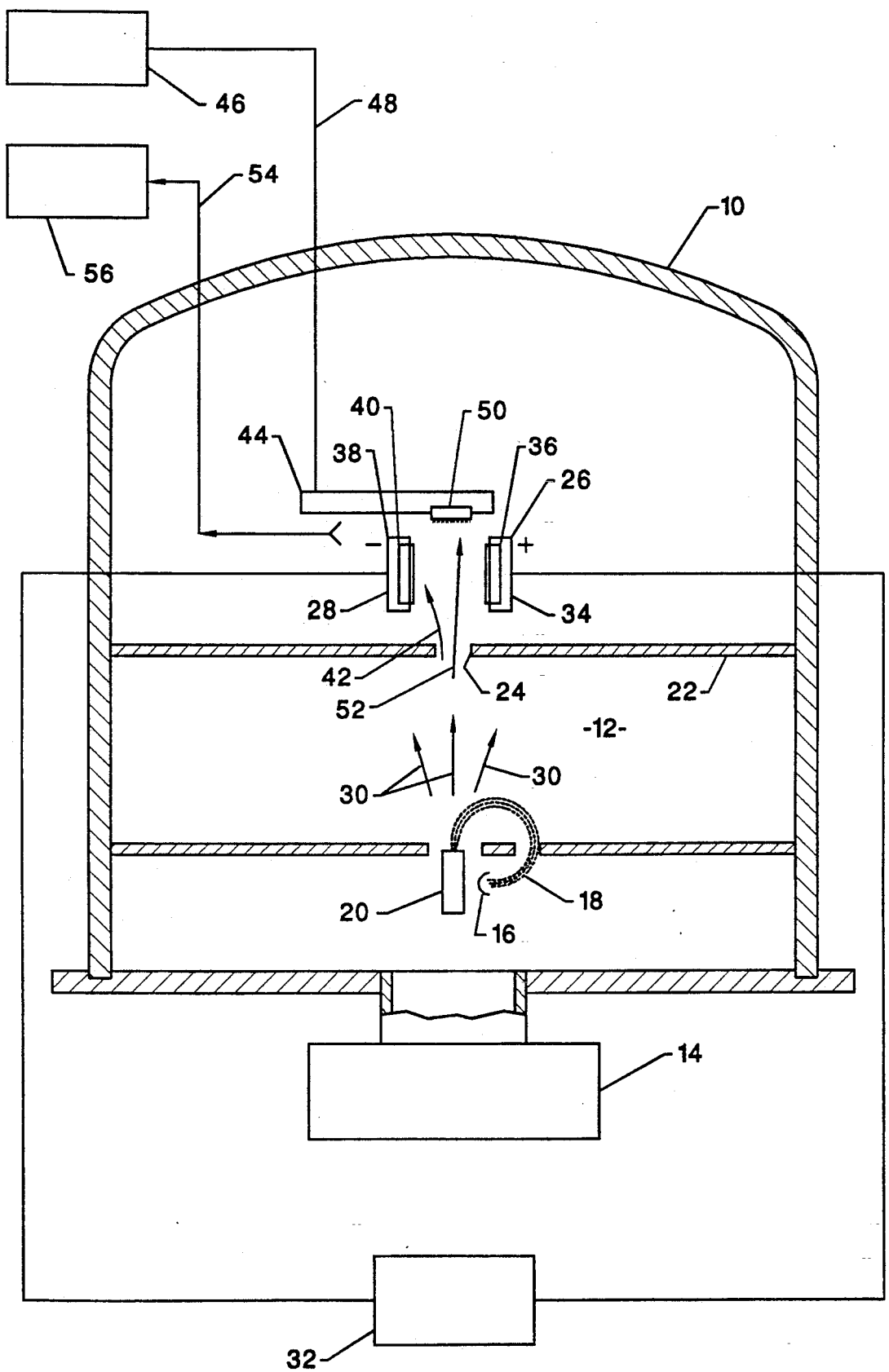
FIG. 1 is a schematic representation of a preferred exemplary system in accordance with the present invention for producing fullerenes by electron beam evaporation of a carbon target in a vacuum.

FIG. 1 is a schematic representation of a preferred exemplary system for conducting fullerene production in accordance with the present invention. The system is a conventional electron beam evaporation system which includes a number of modifications to provide production of soot which contains fullerenes.

The system includes an electron beam evaporation vessel 10 which provides an evaporation zone 12 which is maintained under vacuum by vacuum pump 14. The vacuum pump 14 must be capable of providing a high vacuum within the evaporation vessel 10. It is preferred that the pressure within the evaporation zone be maintained at or below about $10^{-2}$ Torr. Pressures in the range of $10^{-6}$ Torr to $10^{-2}$ Torr are preferred with operating pressures on the order of $2 \times 10^{-5}$ Torr providing an adequate vacuum for most electron beam evaporation processes in accordance with the present invention.

The vessel 10 is preferably a stainless steel bell jar or other vessel which is capable of withstanding the high vacuums required to carry out the present invention. The vacuum pump is preferably a 10 inch fractionating diffusion pump with an anti-migration type liquid nitrogen trap or a turbo molecular pump.

An electron beam gun is provided as shown at 16 for producing an electron beam 18 which is directed towards the carbon target 20. The carbon target 20 is preferably in the form of a one inch diameter graphite rod which is placed in a rod-fed electron beam gun which is of the self-accelerated 270° deflection type. An exemplary electron beam gun is the Airco Temescal Model RIH270. Other conventional electron beam guns may be utilized provided that they are capable of generating an electron beam with sufficient energy to evaporate carbon atoms from the target 20. An exemplary power supply for use with the electron beam gun is an Airco Temescal Model CV30 which is a 30 kW unit that may be operated at a constant voltage such a 10 kilovolts with a variable emission current.

A separation plate 23 provides an electron beam generation zone 25 which isolates the electron beam generation module 16 and keeps it in a lower pressure environment than the region where carbon vapors are formed.

Graphite is the preferred carbon target material. However, other forms of carbon may be used including pyrolytic carbon, amorphous carbon and any other form of carbon which produces fullerenes when evaporated by an electron beam in a vacuum. The power supply and other details of the electron beam gun are not depicted in the FIG. 1 because these items are conventional and well-known in the art of electron beam evaporation.

A horizontal plate 22 located above the carbon billet 20 is provided with an aperture 24 through which the evaporated carbon species pass. The aperture 24 is located directly between and below an anode substrate 26 and a cathode substrate 28. The carbon atom species or clusters formed therefrom which are evaporated from target 20 form a flux or vapor of evaporated carbon atoms or clusters as represented by lines 30. The flow of carbon atoms or clusters 30 is controlled by aperture 24 so that they pass between anode substrate 26 and cathode substrate 28. An electric potential is applied between the anode and cathode substrates by way of power supply 32. The power supply 32 must be capable of applying a potential on the order of 500 to 2,000 volts. Typically, potentials on the order of 1,000 volts are adequate.

The anode and cathode substrates 26, 28 are preferably composed of two elements. The first element is an electrode element made from a highly conductive metal, such as gold, silver, platinum or copper. To the electrode element is clamped a substrate such as quartz, silicon or copper. The size of the electrodes and substrates may be varied widely. Preferably, the substrate surfaces will be spaced apart between 2 cm and 10 cm with a substrate spacing on the order of 5 cm being preferred. In addition, it is preferred that the anode and cathode substrates be heated to temperatures above 100° C. Temperatures on the order of 200° C. are preferred. Heating of the anode and cathode substrates may be accomplished using any suitable heating element, such as a quartz lamp (not shown).

In FIG. 1, the highly conducting metal portion of anode 26 is shown at 34 with the actual substrate upon which evaporated atoms are deposited being shown at 36. With respect to cathode substrate 28, the conducting electrode element is shown at 38 with the substrate on which deposition occurs being shown at 40. In accordance with the present invention, an electrical potential is applied between anode substrate 26 and cathode substrate 28 so that the evaporated carbon atoms or clusters are preferentially drawn toward and deposited on the substrate 40. The preferential deposition of the carbon atoms or clusters on substrate 40 is represented by arrow 42. In accordance with the present invention, it was discovered that the carbon soot which is deposited on substrate 40 is rich in $C_{70}$ and higher fullerenes.

In addition to the anode and cathode substrates, a chilled plate or substrate 44 is provided directly over aperture 24. The plate 44 is preferably made from copper or other highly conductive metal. Preferably, the plate 44 is not charged and is chilled to temperatures below about 25° C. Preferably, the plate 44 is chilled with liquid nitrogen. A reservoir 46 of a liquid nitrogen is provided which is introduced through line 48 into suitable cooling ducts which are located in or in contact with plate 44 in order to maintain the plate 44 at the extremely cold temperature of liquid nitrogen. Other cooling apparatus may be used and various cooling temperatures may be maintained in order to obtain different soot compositions and deposition rates. The soot which is deposited on plate 44 is represented at 50. The soot 50 is deposited from carbon atoms represented by arrow 52 which are not diverted to the cathode substrate 40 as the carbon atoms or clusters pass through aperture 24.

The carbon soot which is deposited on cathode substrate 28 and plate 44 is removed from the vessel 10 as represented by arrow 54 and subjected to extraction with non-polar solvents to recover fullerenes from the soot. Extraction of the fullerenes from the carbon soot can be accomplished using any of the known non-polar solvents in which fullerenes are soluble. Suitable non-polar solvents include pentane, hexane, heptane, octane, benzene, alkyl-benzenes including toluene and xylene, carbon disulfide, pyridine, quinoline, carbon tetrachloride and trichloroethane. Hot toluene is the preferred solvent. The temperature of the hot toluene is preferably maintained at or slightly below its boiling point.

In addition to collection of soot from plate 44 and cathode substrate 28, soot may be collected from various other locations in the evaporation vessel including the vessel walls, the horizontal plate 22 and the anode substrate 36. Although the amounts of carbon soot which deposit at these various locations may be less than the amount of carbon soot deposited on the cathode substrate 28 and plate 44, it is contemplated within the scope of the present invention that soot which deposits on the reactor walls and other locations within the vacuum chamber may be recovered and extracted to isolate fullerenes present in the soot.

The particular extraction procedure used to separate the fullerenes from the non-fullerene soot material can include any combination of extraction and/or separation procedures. Preferably, the soot is exposed to the non-polar solvent for a sufficient time to remove substantially all of the fullerenes from the soot into the solvent. The fullerenes can then be separated from other soluble components in the extract by conventional separation procedures such as chromatography. The extraction and separation is preferably conducted outside the evaporation vessel 10 as represented by box 56. The fullerenes separated from the soot can be left as a mixture of higher fullerenes or can be separated by chromatography into various fractions of individual fullerenes.

Examples of practice are as follows:

The system shown in FIG. 1 was utilized to produce fullerenes by electron beam evaporation of a 2.5 centimeter diameter POCO graphite rod. The electron beam gun used to evaporate the carbon atoms was an Airco Temescal Model RIH-270 which was powered by an Airco Temescal Model CV30 kW power unit. The power unit was operated at a constant voltage of 10 kilovolts and the electron beam emission current was 0.2 Amp. The 0.2 Amp emission current was necessary to maintain a high evaporation rate which is necessary for fullerene formation. The base pressure in the stainless steel bell jar 10 was $4 \times 10^{-6}$ Torr. The operating pressure was $2 \times 10^{-5}$ Torr without the introduction of any working gas. The vacuum was maintained within the bell jar 10 by a fractionating diffusion pump with an anti-migration type liquid nitrogen trap.

Figure 2:
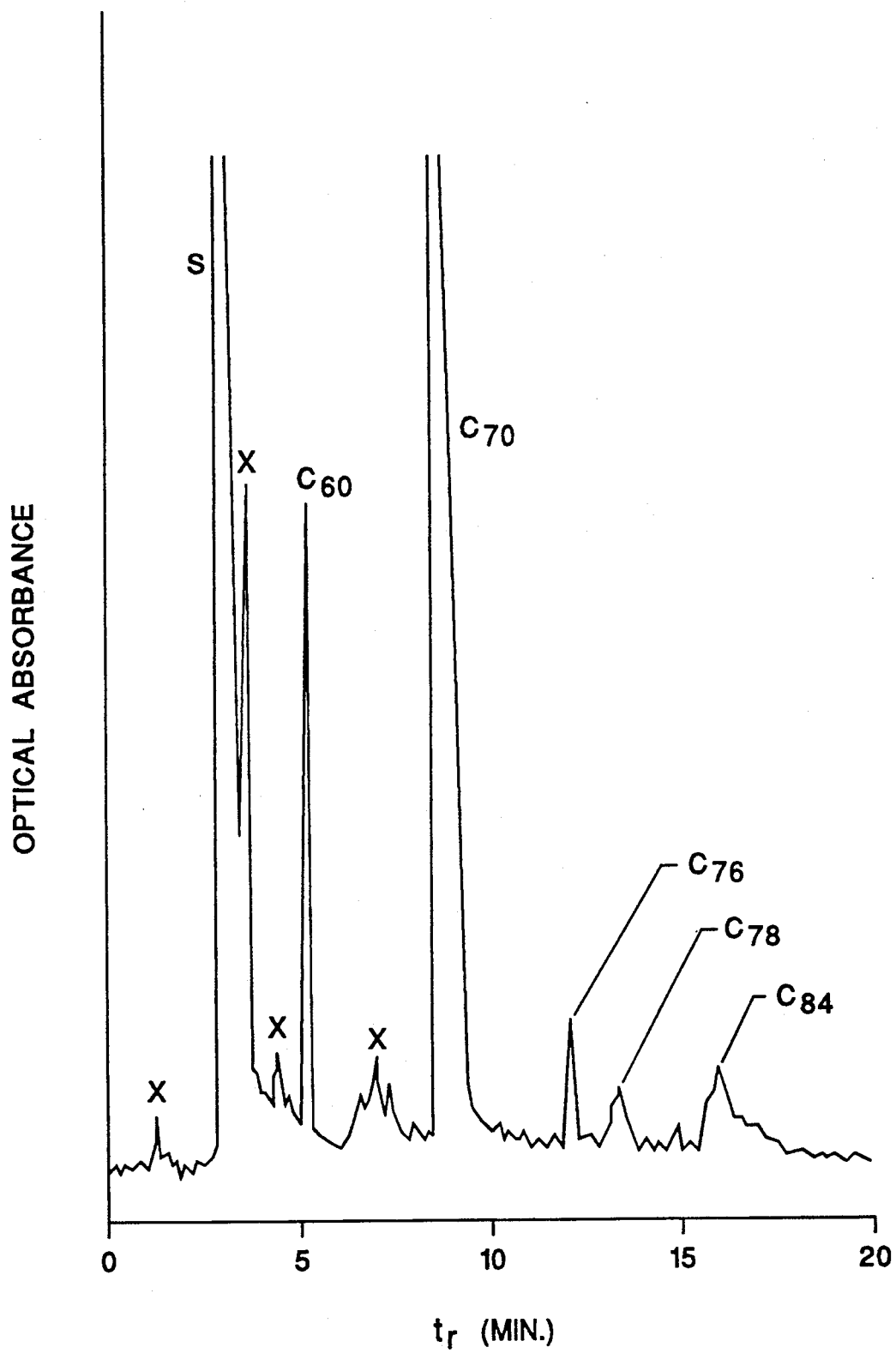
FIG. 2 depicts the results of high performance liquid chromatography (HPLC) separation of fullerenes in an extract sample taken from carbon soot produced by electron beam evaporation in accordance with the present invention.

The flux of carbon species or clusters characterized by a high mean free path was made to pass through the aperture 24 in horizontal plate 22. Behind the aperture, quartz substrates were clamped to two electrodes. The quartz substrates were located 5.5 centimeters apart. The substrates were heated from the backside with quartz lamps to 200° C. A 1,000 volt potential was applied between the anode substrate and cathode substrate. This voltage was found to be sufficient to deviate charged particles from the flux of carbon species or clusters onto the electrode substrates. The copper plate 44 located above the aperture 24 was cooled with liquid nitrogen. Carbon soot from the portion of the direct beam which was not deviated by the electrostatic field was deposited onto copper plate 44. The carbon soot which was deposited on the copper plate contained species of carbon atoms or clusters in the flux which were neutral or they were charged but had too high an energy level to be deviated efficiently in the electrostatic field. The electron beam evaporation was conducted for sufficient time to form a conical hole in the graphite rod of approximately 5 millimeters in depth and 10 millimeters in diameter at the rod surface. Carbon soot was collected from the copper plate 44 and both the cathode and anode substrates. The carbon soot from each location was extracted with hot toluene and filtered through a plug of cotton to remove particulate matter. Each extract was concentrated by rotary evaporation. HPLC analysis was performed using a Vydac $C_{18}$ reversed-phase column using toluene:acetone nitrile (1:1 V V) as the eluant (5). The soot recovered from the copper plate 44 and cathode substrate 28 were found to contain $C_{70}$ and a significant amount of higher fullerenes. The yield from the soot recovered from these two locations was on the order of 0.5 weight % of the total collected material. Only a minor quantity of $C_{60}$ was isolated in each case. Only traces of fullerenes were detected in the soot which was deposited on the anode substrate 26. FIG. 2 is the results of the HPLC analysis of the extract recovered from the cathode substrate 28.

In additional production runs, the quantity of the soluble higher fullerenes in the range between $C_{76}$ and $C_{84}$ was equal to or exceeded the amount of $C_{60}$ formed. The identity of the fullerenes was confirmed by HPLC comparisons with pure standards and by laser desorption time-of-flight (LD-TOF) mass spectrometry. The yield of fullerenes in the soot produced by evaporation was approximately 0.5%. The yield may be increased by changing the various parameters, such as evaporation power, location of substrate surfaces and the like and by providing auxillary ionization modules in the evaporation zone 12. Accordingly, optimization of fullerene production can be further achieved by routine experimentation with different process variables.

Additional examples of practice are as follows:

The process set forth in the above example is carried out except that amorphous carbon is substituted for the POCO graphite. Alternatively, low density graphite powder is substituted for the high density POCO graphite.

In other examples, the same process is conducted as in the first example except the distances between the aperture plate 22 and the carbon source 20 are varied to achieve different levels of soot deposition on electrode substrates 26 and 28. Also, the distance between the substrates 36 and 40 is varied to achieve different levels of soot deposition thereon. Additionally, the primary electron current density is varied to achieve different levels of soot production resulting in different levels of fullerenes being recovered.

As a further example, electron enhanced gas phase reaction is provided in the evaporation zone by a cathode/anode assembly wherein a potential is applied between a negatively charged filament and an anode. Such assemblies, as is well known, include the north pole of a magnetic assembly associated with the filament with south pole of the magnetic assembly being associated with the anode. Typical acceleratory voltages are 30–200 volts and electron beam currents of 1 to 500 mA.

Alternatively, radio frequency (RF) excitation of the plasma or vapor in zone 12 can be used instead of the above direct current excitation. Well known techniques regarding the use of an RF antenna located in the evaporation zone 12 may be used to provide production of differing levels of soot and differing levels of fullerenes contained therein.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

BIBLIOGRAPHY

1. Kratschmer, W.; Lamb, L. D.; Fostiropoulos, K.; Huffman, D. R. *Nature* 1990, 347, 354.
2. Ajie, H.; Alvarez, M. M.; Anz, S. J.; Beck, R. D.; Diederich, F.; Fostiropoulos, K.; Huffman, D. R.; Kratschmer, W.; Rubin, Y.; Schriver, K. E.; Sensharma, D.; Whetten, R. L. *J. Phys. Chem.* 1990, 94, 8630.
3. Haufler, R. E.; Conceicao, J.; Chibante, L. P. F.; Chai, Y.; Byrne, N. E.; Flanagan, S.; Haley, M. M.; O'Brien, S. C.; Pan, C.; Xiao, Z.; Billups, W. E.; Ciufolini, M. A.; Hauge, R. H.; Margrave, J. L.; Wilson, L. J.; Curl, R. F.; Smalley, R. E. *J. Phys. Chem.* 1990, 94, 8634.
4. Kroto, H. W.; Allaf, A. W.; Balm, S. P. *Chem. Rev.* 991, 91, 1213.
5. The Mar. 1992 issue of *Acc. Chem. Res.* (1992, 25, 97–175) is entirely dedicated to fullerene research and describes the chemistry and physics of these new carbon allotropes in eleven review articles written by various authors.
6. Diederich, F.; Ettl, R.; Rubin Y.; Whetten, R. L.; Beck, R.; Alvarez, M.; Anz, S.; Sensharma, D.; Wudl, F.; Khemani, K. C.; and Kock, A. *Science* Vol. 252, pp. 548–551 (Apr. 26, 1991)
7. Li, Q.; Wudl, F.; Thilgen, C.; Whetten, R. L.; Diederich, F. *J. Am. Chem. Soc.* 1992, 114, 3994.
8. Peters, G.; Jansen M. *Angew. Chem.* 1992, 104, 240; *Angew. Chem. Int. Ed. Engl.* 1992, 31, 223
9. Howard, J. B.; McKinnon, J. T.; Makarovsky, Y.; Lafleur, A. L.; Johnson, M. E. *Nature* 1991, 352, 139.
10. Maissel, L. I.; Glang, R. (Eds.) "Handbook of Thin Film Technology", MacGraw Hill: N.Y.: 1970.
11. Bunshah, R. F. (Ed.) "Deposition Technologies for Films and Coatings", Noyes Publications: N.J., 1982.

What is claimed is:

1. A process for producing $C_{70}$ and higher fullerenes comprising the steps of:
    providing a carbon target in an electron beam evaporation zone;
    maintaining a vacuum in said evaporation zone;
    bombarding said carbon target with an electron beam of sufficient energy to evaporate carbon atoms from said target to form a vapor of evaporated carbon atoms or clusters;
    depositing said evaporated carbon atoms or clusters onto a substrate to form carbon soot which contains fullerenes wherein said depositing of said evaporated carbon atoms or clusters comprises the steps of:
    providing an anode substrate and a cathode substrate at spaced locations within said evaporation zone;
    applying an electrical potential between said anode and cathode substrate to provide said anode with a positive electrical potential and to provide said cathode with a negative electrical potential;
    separating said fullerenes from said carbon soot.
2. A process for producing fullerenes according to claim 1 wherein said carbon target consists essentially of graphite.
3. A process for producing fullerenes according to claim 1 wherein the vacuum is maintained in said evaporation zone so that the pressure within said vacuum zone is below $10^{-2}$ Torr.
4. A process for producing fullerenes according to claim 1 wherein said step of depositing said evaporated carbon atoms or clusters comprises the steps of:
    providing a chilled, non-charged substrate in said evaporation zone;
    depositing said evaporated carbon atoms or clusters onto said chilled substrate to form said soot containing fullerenes thereon.
5. A process for producing fullerenes according to claim 1 wherein said step of separating said fullerenes from said carbon soot comprises the steps of:
    removing at least a portion of said carbon soot from the cathode substrate; and
    extracting said fullerenes from said carbon soot removed from said cathode substrate by treating said removed soot with a solvent in which one or more of said fullerenes are soluble.
6. A process for producing fullerenes according to claim 4 wherein said step of separating said fullerenes from said carbon soot comprises the steps of:
    removing at least a portion of said carbon soot from said chilled substrate; and
    extracting said fullerenes from said carbon soot removed from said chilled substrate by treating said removed soot with a solvent in which one or more of said fullerenes are soluble.
7. A process for producing fullerenes according to claim 1 wherein said solvent is selected from the group consisting of pentane, hexane, heptane, octane, benzene, alkyl-benzenes, carbon disulfide, pyridine, quinoline, carbon tetrachloride and trichloroethane mixtures thereof.
8. A process for producing fullerenes according to claim 7 wherein said solvent is toluene.

* * * * *